US010288754B2

(12) United States Patent
Liu et al.

(10) Patent No.: US 10,288,754 B2
(45) Date of Patent: May 14, 2019

(54) SEISMIC NOISE REMOVAL (71) Applicant: WESTERNGECO L.L.C., Houston, TX (US)

(72) Inventors: Kuang-Hung Liu, Houston, TX (US); William H. Dragoset, Jr., Houston, TX (US)

(73) Assignee: WESTERNGECO L.L.C., Houston, TX (US)

( * ) Notice: Subject to any disclaimer, the term of this patent is extended or adjusted under 35 U.S.C. 154(b) by 906 days.

(21) Appl. No.: 14/389,349

(22) PCT Filed: Mar. 29, 2013

(86) PCT No.: PCT/US2013/034567
§ 371 (c)(1),
(2) Date: Sep. 29, 2014

(87) PCT Pub. No.: WO2013/149126
PCT Pub. Date: Oct. 3, 2013

(65) Prior Publication Data
US 2015/0066375 A1 Mar. 5, 2015

Related U.S. Application Data

(60) Provisional application No. 61/617,577, filed on Mar. 29, 2012.

(51) Int. Cl.
*G01V 1/00* (2006.01)
*G01V 1/28* (2006.01)
(Continued)

(52) U.S. Cl.
CPC ............ *G01V 1/364* (2013.01); *G01V 1/247* (2013.01); *G01V 1/36* (2013.01); *G01V 1/366* (2013.01);
(Continued)

(58) Field of Classification Search
None
See application file for complete search history.

(56) References Cited

U.S. PATENT DOCUMENTS 4,853,902 A 8/1989 Corrigan et al.
4,887,243 A 12/1989 Pann
(Continued)

FOREIGN PATENT DOCUMENTS

| EP | 0723669 B1 | 12/1999 |
| WO | 2005/103764 A1 | 11/2005 |
| WO | 2011126753 A1 | 10/2011 |

OTHER PUBLICATIONS

Donno, "Improving multiple removal using least-squares dip filters and independent component analysis", Geophysics, Society of Exploration Geophysicists, vol. 76, Issue 5, Sep. 2011, V91-V104.
(Continued)

*Primary Examiner* — Aditya S Bhat
(74) *Attorney, Agent, or Firm* — Michael Guthrie (57) ABSTRACT

A method for removing seismic noise from an input seismic trace. The method may receive the input seismic trace. The method may receive one or more noise references for the input seismic trace. The method may receive one or more filters corresponding to the noise references. The method may apply a nonlinear function to the input seismic trace and to the one or more noise references to produce respective output signals for the input seismic trace and for the one or more noise references. The nonlinear function may be capable of determining higher-order statistics. The method may update the filters based on increasing one or more information attributes of the output signals to a predetermined threshold. The method may then filter noise corresponding to the noise references.

9 Claims, 5 Drawing Sheets (51) Int. Cl.
    G01V 1/36        (2006.01)
    G01V 1/24        (2006.01)
(52) U.S. Cl.
    CPC ............... G01V 2210/324 (2013.01); G01V
           2210/3246 (2013.01); G01V 2210/56 (2013.01)

(56)                References Cited

U.S. PATENT DOCUMENTS 5,791,095  A      8/1998  Sorkin
    8,164,978  B2     4/2012  Terenghi et al.
    8,538,702  B2 *   9/2013  Neelamani ............... G01V 1/30
                                                           702/14
    9,581,711  B2     2/2017  Terenghi et al.
 2003/0048696  A1     3/2003  Duren
 2007/0064531  A1     3/2007  Dubose
 2008/0043573  A1     2/2008  Bisley et al.
 2009/0288823  A1    11/2009  Baumstein
 2010/0097888  A1*    4/2010  Neelamani ............. G01V 1/005
                                                           367/53
 2010/0186950  A1*    7/2010  Neelamani ............... G01V 1/30
                                                        166/250.01

OTHER PUBLICATIONS

Supplementary European Search Report issued in related EP Application No. 13767636.7 dated Dec. 2, 2015 (4 pages).
Communication issued in related EP Application No. 13767636.7 dated Dec. 11, 2015 (7 pages).
International Search Report and Written Opinion issued in related International Application No. PCT/US2013/034567 dated Jul. 14, 2013 (9 pages).
Bell, et al., "An information maximization approach to blind separation and blind deconvolution: Neural Computation", Neural Computation, vol. 7, No. 6, Nov. 1995, pp. 1129-1159.
Kaplan, et al., "Adaptive separation of free-surface multiples through independent component analysis", Geophysics, vol. 73, No. 3, Jan. 2009, pp. V29-V36.
Torkkola, et al., "Blind separation of convolved sources based on information maximization", Neural Networks for Signal Processing, Proceedings of the IEEE Signal Processing Society Workshop, Sep. 4-6, 1996, pp. 423-432.
Abma, et al. "Comparisons of adaptive subtraction methods for multiple attenuation," The Leading Edge, vol. 24, Issue 3, Mar. 2005, pp. 277-280.
Bell, et al., "An information maximization approach to blind separation and blind deconvolution," Neural Computation, 1995, 7(6), pp. 1129-1159.
Berkhout, et al., "Estimation of multiple scattering by iterative inversion, Part I: Theoretical considerations," Geophysics, Sep.-Oct. 1997, 62, No. 5, pp. 1586-1595.
Comon, "Independent component analysis, A new concept?," Signal Processing, 1994, vol. 36, pp. 287-314.
Dragoset, et al., "The impact of field-survey characteristics on surface-relatedmultiple attenuation," Geophysical Prospecting, 2006, vol. 54, Issue 6, pp. 781-791.
Dragoset, et al., 2010, "A perspective on 3D surface-related multiple elimination," Geophysics, 2010, vol. 75, No. 5, pp. 75A245-75A261.
Dragoset, "A practical approach to surface multiple attenuation," SEG Expanded Abstracts, 1998, pp. 1230-1233.
Dragoset, et al., "Some remarks on surface multiple attenuation," Geophysics, Mar.-Apr. 1998, vol. 63, No. 2, pp. 772-789.

Guitton, "Multiple attenuation in complex geology with a pattern-based approach," Geophysics, Jul.-Aug. 2005, vol. 70, No. 4, pp. V97-V107.
Guitton, et al., "Adaptive subtraction of multiples using the l1-norm," Geophysical Prospecting, 2004, vol. 52, Issue 1, pp. 27-38.
Herrmann, et al., "Nonlinear primary-multiple separation with directional curvelet frames," Geophysical Journal International, 2007, vol. 170, pp. 781-799.
Hyvaarinen, et al., "Independent component analysis: algorithms and applications," Neural Networks, 2000, vol. 13, No. 4-5, pp. 411-430.
Jakubowicz, "Wave equation prediction and removal of interbed multiples," 78th Annual International Meeting, SEG, Expanded Abstracts, 1998, vol. 17, pp. 1527-1530.
Kaplan, et al., "Blind deconvolution and ICA with a banded mixing matrix," 4th International Symposium on Independent Component Analysis and Blind Signal Separation, Apr. 2003, pp. 591-596.
Kelamis, et al., "Case History: Surface-Related Multiple Elimination on Land Seismic Data-Strategies via Case Studies," Geophysics, May-Jun. 2000, vol. 65, No. 3, pp. 719-734.
Kelamis, et al., "Data-Driven Internal Multiple Attenuation—Application and Issues on Land Data," SEG International Exposition and 72 Annual Meeting, Oct. 2002, pp. 1-4.
Koek, et al., "Regularization of 3-D Seismic Data in Two Steps," SEG Expanded Abstracts, 1997, pp. 1171-1172.
Kroode, "Prediction of Internal Multiples," Wave Motion, 2002, vol. 35, pp. 315-338.
Liu, et al, "Adaptive multiple separation based on information maximization," SEG Las Vegas 2012 Annual Meeting, pp. 1-6.
Liu, et al., "Blind source separation of seismic signals based on information maximization," Geophysics, vol. 78, No. 4, Jul.-Aug. 2013, pp. V119-V130.
Lu, "Adaptive multiple subtraction using independent component analysis," Geophysics, Sep.-Oct. 2006, vol. 71, No. 5, pp. S179-S184.
Moore, "Practical Implementation of Interbed Multiple Attenuation," Exploration Geophysics, 2001, vol. 32, pp. 080-088.
Nekut, et al., "Minimum energy adaptive subtraction in surface-related multiple attenuation," 78th Annual International Meeting, 1998, SEG, Expanded Abstracts, vol. 17, pp. 1507-1510.
Riley, et al., "2-D multiple reflections," Geophysics, Aug. 1976, vol. 41, No. 4, pp. 592-620.
Robinson, et al., "Digital Imaging and Deconvolution," The ABCs of Seismic Exploration and Processing, 2008, Society of Exploration Geophysicists.
Ronen, "Wave-Equation Trace Interpolation," Geophysics, Jul. 1987, vol. 52, No. 7, pp. 973-984.
Simon, "Pattern recognition, spatial predictability, and subtraction of multiple events," The Leading Edge, Jan. 1999, vol. 18, pp. 55-58.
Verschuur, et al., "Estimation of multiple scattering by iterative inversion, Part II: Practical aspects and examples," Geophysics, Sep.-Oct. 1997, vol. 62, No. 5, pp. 1596-1611.
Walden, "Non-Gaussian reflectivity, entropy, and deconvolution," Geophysics, Dec. 1985, vol. 50, No. 12, pp. 2862-2888.
Weglein, et al., "An inverse-scattering series method for attenuating multiples in seismic reflection data," Geophysics, Nov.-Dec. 1997, vol. 62, No. 6, pp. 1975-1989.
Xu, et al., "Antileakage Fourier Transform for Seismic Data Regularization," Geophysics, Jul.-Aug. 2005, vol. 70, No. 4, pp. V87-V95.
Communication pursuant to Article 94(3) for the equivalent European patent application 13767636.7 dated Dec. 20, 2017.
Communication pursuant to Article 94(3) for the equivalent European patent application 13767636.7 dated May 25, 2018.

* cited by examiner

SEISMIC NOISE REMOVAL

CROSS-REFERENCE TO RELATED APPLICATIONS

This application claims benefit of U.S. provisional patent application Ser. No. 61/617,577, entitled METHODS AND DEVICES FOR MULTIPLE PREDICTION AND ELIMINATION, filed Mar. 29, 2012, which is herein incorporated by reference.

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and applicant neither concedes nor acquiesces to the position that any given reference is prior art or analogous prior art.

Seismic exploration may utilize a seismic energy source to generate acoustic signals that propagate into the earth and partially reflect off subsurface seismic reflectors (e.g., interfaces between subsurface layers). The reflected signals are recorded by sensors (e.g., receivers or geophones located in seismic units) laid out in a seismic spread covering a region of the earth's surface. The recorded signals may then be processed to yield a seismic survey.

In general, sensors may detect reflected signals that include primaries and multiples as well as other noise sources in the environment. A primary may be a seismic wave that has reflected once off an interface before being detected by a sensor. A multiple, on the other hand, may be a seismic wave that has reflected off an interface more than once, i.e., multiple times. Other types of noise may include direct arrivals, ground-roll, ambient noise, or any other noise.

As those with skill in the art will appreciate, processing techniques for seismic data may be successfully applied to other types of collected data in varying circumstances as will be discussed herein.

Accordingly, there is a need for methods and computing systems that can employ more effective and accurate methods for identifying, isolating, and/or processing various aspects of seismic signals or other data that is collected from a subsurface region or other multi-dimensional space.

SUMMARY

Described herein are implementations of various technologies for a method, which may include receiving an input seismic trace. The method may receive multiple predictions for the input seismic trace. The method may receive filters corresponding to the multiple predictions. The method may include applying a nonlinear function to the input seismic trace and to the multiple predictions to produce respective output signals for the input seismic trace and to the multiple predictions. The nonlinear function may be capable of determining higher-order statistics. The method may update the filters based on increasing information attributes of the output signals to a predetermined threshold. The method may filter multiples corresponding to the multiple predictions from the input seismic trace using the updated filters.

Described herein are implementations of various technologies for a method, which may include receiving an input seismic trace. The method may receive noise references for the input seismic trace. The method may receive filters corresponding to the noise references. The method may apply a nonlinear function to the input seismic trace and to the noise references to produce respective output signals for the input seismic trace and to the multiple predictions. The nonlinear function may be capable of determining higher-order statistics. The method may update the filters based on increasing one or more information attributes of the output signals to a predetermined threshold. The method may filter noise corresponding to the noise references from the input seismic trace using the updated filters.

Described herein are implementations of various technologies for a method, which may include receiving an input seismic trace. The method may receive noise references for the input seismic trace. The method may determine independent components from the input seismic trace and the noise references using an independent component analysis (ICA) algorithm based on information attributes between the input seismic trace and the noise references. The method may determine non-similar independent components using a similarity criterion by comparing the independent components to the noise references. The method may combine the non-similar independent components to produce a filtered seismic trace.

The above referenced summary section is provided to introduce a selection of concepts that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure. Indeed, the systems, methods, processing procedures, techniques, and workflows disclosed herein may complement or replace conventional methods for identifying, isolating, and/or processing various aspects of seismic signals or other data that is collected from a subsurface region or other multi-dimensional space, including time-lapse seismic data collected in a plurality of surveys.

BRIEF DESCRIPTION OF THE DRAWINGS

Implementations of various technologies will hereafter be described with reference to the accompanying drawings. It should be understood, however, that the accompanying drawings illustrate various implementations described herein and are not meant to limit the scope of various technologies described herein.

DETAILED DESCRIPTION

The discussion below is directed to certain specific implementations. It is to be understood that the discussion below is only for the purpose of enabling a person with ordinary skill in the art to make and use any subject matter defined now or later by the patent "claims" found in any issued patent herein.

Reference will now be made in detail to various implementations, examples of which are illustrated in the accompanying drawings and figures. In the following detailed description, numerous specific details are set forth in order to provide a thorough understanding of the claimed invention. However, it will be apparent to one of ordinary skill in the art that the claimed invention may be practiced without these specific details. In other instances, well known methods, procedures, components, circuits, and networks have not been described in detail so as not to unnecessarily obscure aspects of the claimed invention.

It will also be understood that, although the terms first, second, etc. may be used herein to describe various elements, these elements should not be limited by these terms. These terms are used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description herein is for the purpose of describing particular implementations and is not intended to limit the claimed invention. As used herein, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Attenuating multiple reflections and other noise from seismic data may provide an accurate depiction of primary reflections within a subsurface. Traditionally, seismic filtering processes have applied least-squares (LS) matched filtering to remove multiples from seismic data. However, LS matched filtering may be overly aggressive, thereby damaging the primary reflections within the seismic data.

Various implementations described herein are directed to a method used to remove noise from seismic data in order to obtain a seismic trace that approximates the primary reflections. This method may include several steps.

In the first step, an input seismic trace and noise references may be obtained, while filters corresponding to the noise references are initialized. A noise reference may be a multiple prediction, though other types of noise estimates may be used instead, such as estimates for ground-roll, direct arrivals, or ambient noise. The filters may be finite impulse response (FIR) filters, each with a length representing the number of filter coefficients. For initialization, the filters may be set to zero or another predetermined value.

Steps two to four describe an information maximization process for updating the filters for separating the primary reflections from noise in the seismic data. Steps two to four may iterate until the filters are found to converge to a global optimum or other predetermined value.

In the second step, output signals may be determined for the input seismic trace and noise references. The output signals may be obtained by applying a nonlinear function, where the purpose of the nonlinear function is to approximate a cumulative density function (cdf) of the independent sources. The nonlinear function may be configured so that the output signals are uniformly distributed when the following conditions are satisfied:

Condition (C1): p'[t] carries only one single independent random variable.

Condition (C2): $p'[t], x_1, \ldots x_N$ are mutually independent for each time sample.

Those with skill in the art will appreciate that while C1 and C2 above include terms that could be interpreted as potentially absolute or requiring a given thing (e.g., including without limitation "exactly", "exact", "only", "key", "important", "requires", "all", "each", "must", "always", etc.), the nonlinear function as well as various systems, methods, processing procedures, techniques, and workflows disclosed herein are not to be understood as limited by the use of these terms.

In the third step, the filters are updated with new filter values. This step may be performed by incrementing or decreasing the filter values using a search direction to maximize information attributes between the output signals. The information attributes may include the joint entropy of the output signals. The information attributes may also include the mutual information of output signals.

In the fourth step, the updated filters may be evaluated for convergence based on whether the filter values have reached an optimum value, such as a global optimum. In one implementation, if convergence has not been reached for all of the filters, then steps two and three may be repeated for the updated filter values that have not yet converged.

In the fifth step, a seismic trace that is an approximation of the primary reflections may be obtained by filtering the input seismic trace using the filters acquired in the previous steps.

Various implementations described herein are also directed to a method used to remove noise from seismic data in order to obtain a seismic trace that approximates the primary reflections. This method may include several steps.

In the first step, an input seismic trace and noise references may be obtained and used as input data.

In the second step, the input data may be used to determine the independent components using an independent component analysis algorithm. The second step may include estimating a de-mixture matrix for separating the independent components. For instance, the de-mixture matrix may be a deconvolution matrix.

In the third step, a similarity criterion may be used to compare the independent components with the noise references to find the non-similar independent components.

In the fourth step, a filtered trace may be computed by combining the non-similar independent components using an estimated mixture matrix that may be calculated through an independent component analysis algorithm.

Removing Seismic Noise Using Information Maximization

An input seismic trace may be defined by the following equation:

$$x_0[t] = p[t] + \sum_{i=1}^{N} (h_i * x_i)[t] \quad \text{(Equation 1)}$$

where $x_0[t]$ is the input seismic trace, $p[t]$ represents the unknown primary reflections, $h_1, \ldots, h_N$ are unknowns and * denotes convolution. The presence of $h_1, \ldots, h_N$ are due to the imperfections of multiple prediction and other noise estimation algorithms and may be interpreted as uncertainties for amplitude scaling, phases, time delay, acquisition wavelets, and other characteristics. Reconstructing $p[t]$ may be done based on observations of $x_0, x_1, \ldots, x_N$. This problem may be described as a blind source separation problem and various statistical properties of $p[t]$ and $x_1, \ldots, x_N$ may be exploited in order to obtain a solution. For instance, the following assumption may be made:

Assumption (A1): For each instance of t, $p[t]$, $x_0[t]$, $x_1[t], \ldots x_N[t]$ are assumed as independent random variables drawn from a non-Gaussian probability density function (pdf) f.

Since a Gaussian distribution may be completely determined by its first two moments, the non-Gaussian assumption in A1 may allow the higher-order statics of an input to be utilized. Seismic data may be considered as signals with a non-Gaussian distribution. Furthermore, when $p[t]$ represents a seismic trace, $p[t]$ may be described by a white convolutional model, and if multiple reflections are viewed as a convoluted version of $p[t]$ with a time delay, then assumption A1 holds.

Figure 1:
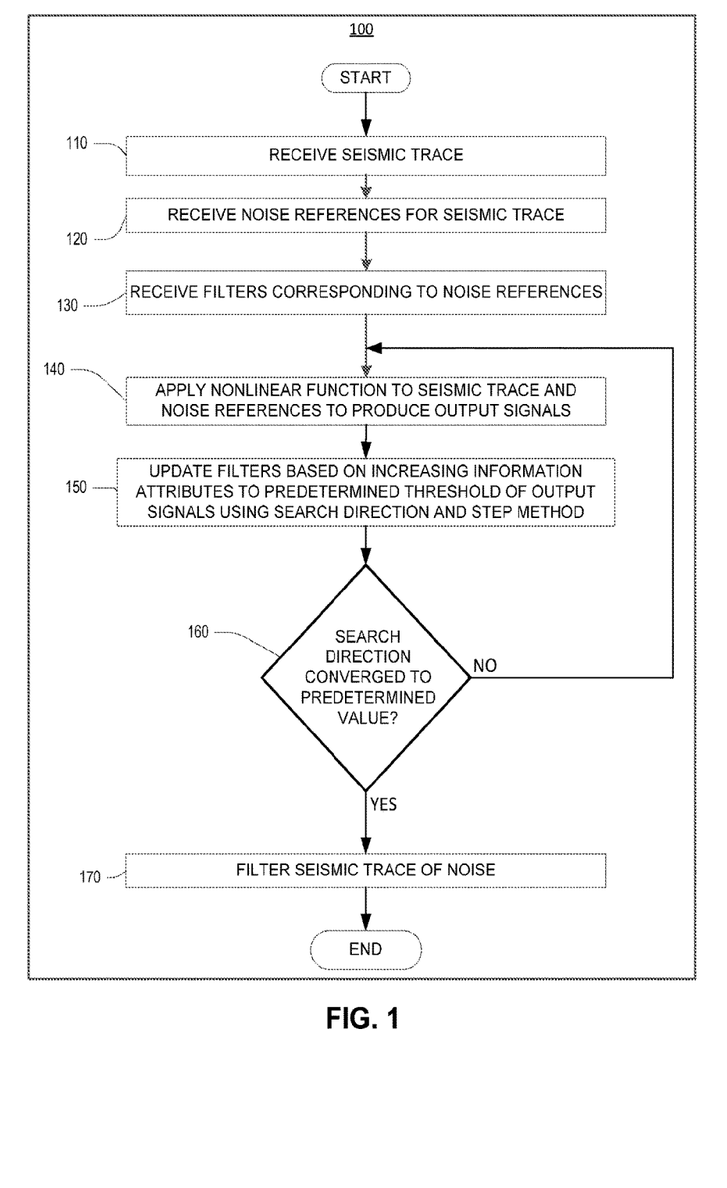
FIG. 1 illustrates a flow diagram of a method for removing noise from an input seismic trace in accordance with various implementations described herein.

FIG. 1 illustrates a flow diagram of a method for removing noise from an input seismic trace in accordance with various implementations described herein. It should be understood that while the operational flow diagram indicates a particular order of execution of the operations, in other implementations, the operations might be executed in a different order. Further, in some implementations, additional operations or steps may be added to the method. Likewise, some operations or steps may be omitted.

At step 110, an input seismic trace, $x_0$, is received. The input seismic trace may be acquired by any seismic survey acquisition method, and may be for either a land-based seismic survey or a marine seismic survey. The input seismic trace may include reflections for a primary wave, p(t), as well as reflections resulting from multiples.

At step 120, one or more noise references are received for the input seismic trace, and may be used as input noise references, $x_1, \ldots x_N$, where N is the number of noise references. A noise reference may be an estimate or a prediction of noise in the input seismic trace. The noise references may be adjusted by scaling factors. Scaling factors may be used where any noise reference interferes with a filter or determining a filter for a different noise reference. For instance, the amplitudes of multiples for different orders as well as multiples at different depths may be very different. Scaling factors may then provide the ability to obtain or apply filters for different orders of multiples. Scaling factors may also be used to optimize method 100. For instance, scaling factors may be used by a weighting algorithm to make certain noise references more prominent than others, which may reduce the contributions of the less prominent noise references to the information maximization process of steps 140 to 160.

One example of a noise reference may be a predicted multiple. A multiple is a reflecting pressure wave that includes a downward reflection into the subsurface. Multiples may be first-order, second-order and higher-orders based on the number of downward reflections. Other noise references may describe a ground-roll, direct arrivals, ambient noise, or any other noise artifacts that may be in the input seismic trace.

For predicting multiples in the input seismic trace, many different estimation methods or prediction algorithms may be used to obtain a noise reference. One example of a method for predicting multiples may be found in U.S. patent application Publication Ser. No. 12/536,316, entitled INTERBED MULTIPLE PREDICTION, filed Aug. 5, 2009, now U.S. Pat. No. 8,164,978, which is herein incorporated by reference. For estimating other types of noise to obtain a noise reference, any method known in the art may be used.

At step 130, filters, $w_1 \ldots w_N$, are received that correspond to the noise references. The filters may be finite impulse response (FIR) filters each with a length that defines the number of filter coefficients, but other filters are contemplated as well. This step may include initializing the received filters to a predetermined filter value for each filter coefficient. For instance, the initialization may include setting the filters to values of a corresponding Least-Square (LS) matching filter. The filters may also be set to values of zero or another arbitrary value without a preprocessing step for estimating the unknown filters.

In one implementation, the filters received in step 130 and updated in step 150 may be filters configured to solve the following equation:

$$p'[t] = x_0[t] + \sum_{i=1}^{N} (w_i * x_i)[t] \quad \text{(Equation 2)}$$

Equation 2 may also be expressed in terms of filter coefficients using the following equation:

$$p'[t] = x_0[t] + \sum_{i=1}^{N} \sum_{j=0}^{K} w_{ij} x_i[t-j] \quad \text{(Equation 3)}$$

Steps 140 to 160 describe an information maximization process for obtaining the filters to produce an approximate signal, p'[t], which may represent the primary reflections in the seismic trace without the filtered noise, such as predicted multiples. Steps 140 to 160 may iterate until each filter is found to converge to a predetermined value.

At step 140, a nonlinear function is applied to the input seismic trace and the estimated noise to produce output signals, $y_0 \ldots y_N$. The output signals may be obtained by applying a nonlinear function g, which is capable of picking up or determining higher-order statistics. Examples of higher-order statistics may include kurtosis, skewness, higher-order moments, higher-order cumulants, or any other applicable statistics. One instance of the nonlinear function g may be defined by the equation:

$$g(x) = \tan h(ax) \quad \text{(Equation 4)}$$

where a is the scaling factor. The output signal, $y_0$, for the input seismic trace may be defined by the equation:

$$y_0 = g\left(a_0\left(x_0 + \sum_{i=1}^{N}(w_i * x_i)\right)\right) \quad \text{(Equation 5)}$$

The output signals corresponding to the noise references may be $y_i = g(x_i)$, where $i=1, \ldots N$ and where $a_0$ is a scaling factor. The application of the nonlinear function g to the input seismic trace and the noise references may be performed to approximate a cumulative density function (cdf) of the independent sources, which are $p[t], x_1, \ldots, x_N$ in this case. The nonlinear function may be configured so that the output signals are uniformly distributed when the following conditions are satisfied:

Condition (C1): $p'[t]$ carries only one single independent random variable.

Condition (C2): $p'[t], x_1, \ldots, x_N$ are mutually independent for each time sample.

Those with skill in the art will appreciate that while C1 and C2 above include terms that could be interpreted as potentially absolute or requiring a given thing (e.g., including without limitation "exactly", "exact", "only", "key", "important", "requires", "all", "each", "must", "always", etc.), the nonlinear function as well as various systems, methods, processing procedures, techniques, and workflows disclosed herein are not to be understood as limited by the use of these terms.

Figure 2:
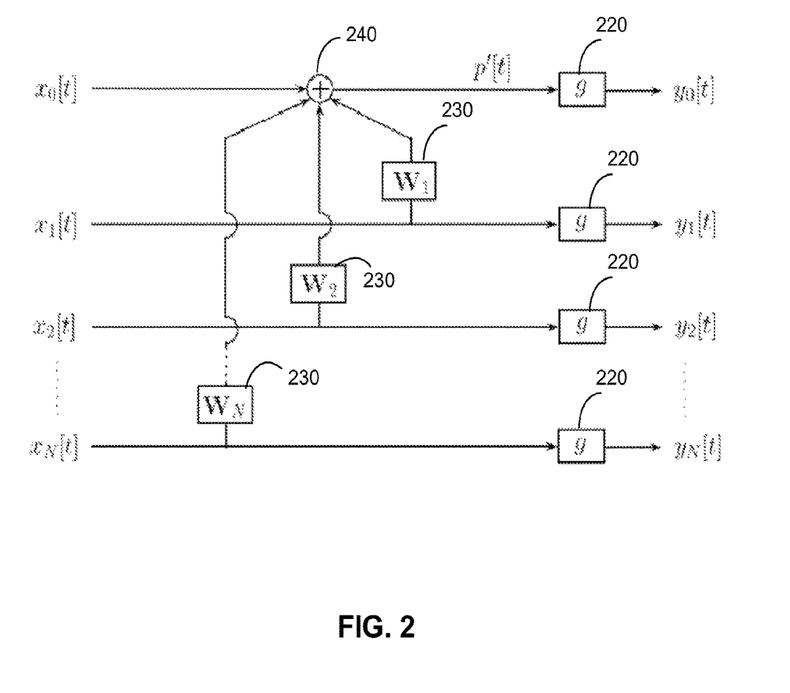
FIG. 2 illustrates a schematic diagram in accordance with various implementations described herein

FIG. 2 illustrates a schematic diagram of step 140. In FIG. 2, the summation operator 240 corresponds to the summation operator in equation 5. Convolution between the noise references, $x_1, \ldots, x_N$ and the filters, wi, are shown by filter stages 230. Stages 220 illustrate the application of the nonlinear function g to each input signal to produce the output signals.

Returning to FIG. 1, at step 150, the filters are updated based on increasing one or more information attributes between each of the output signals (to a predetermined threshold using a search direction, $\Delta w_i$, for each output signal and a step method, $\mu_i$. One example of an information attribute may be the mutual information between the output signals. Increasing an information attribute may also be described as decreasing an information attribute's counterpart. For instance, increasing entropy may also be described as decreasing negentropy. The predetermined threshold may be where C1, C2, or any other specified condition is satisfied. In this instance, the predetermined threshold may based on maximizing the mutual information, where the search direction is found using the following equation:

$$\Delta w_i = \frac{\partial}{\partial w_i}\left(\ln\frac{\partial y_0}{\partial p} + \sum_{i=1}^{N}\ln\frac{\partial y_i}{\partial x_i}\right) \quad \text{(Equation 6)}$$

Increasing or decreasing an information attribute may be performed by updating $w_1, \ldots, w_N$ based on a stochastic gradient ascent rule:

$$w_i(\text{updated}) = w_i + \mu_i \Delta w_i \quad \text{(Equation 7)}$$

where $w_i$ on the left side of equation 7 is the updated filter, and the $w_i$ on the right side of the equation is the $w_i$ filter from the previous iteration or the initialized filter. $\mu_i$ is the step size or learning rate, which may be determined by any applicable line search method. One example of finding the optimal step size method may be the golden section line search method, but other methods of finding the step size may apply. In one implementation, the search direction may be based on another optimization method, such as a conjugate gradient method or Newton's method or any other optimization method.

At step 160, a determination is made for whether the search direction for each filter has converged to a predetermined value. The predetermined value may be a specified value or range of values for which the search direction has reached an optimum value. The filters $w_i, \ldots, w_N$, may be evaluated for convergence based on whether $\Delta w_i, \ldots, \Delta w_N$ have become less than a predetermined value. If there has been no convergence, the process may return to step 140. If convergence has been achieved, the process may proceed to step 170.

At step 170, the input seismic trace, $x_0$, is filtered of noise corresponding to the noise references using the updated filters obtained in the steps 140 to 160. A filtered seismic trace may be obtained by using the updated filters acquired in the previous steps and equation 2, where the filtered noise may be adaptively subtracted from the input seismic trace.

In one implementation, method 100 may obtain updated filters by increasing the joint entropy of the output signals, $H(y_0(t), \ldots, y_N(t))$, where the joint entropy is the information attribute. The predetermined threshold may include maximizing joint entropy of the output signals.

For step 140, the output signals may be obtained by applying a deterministic nonlinear monotonic logistic function, such as the logistic function g that is defined in the following equation:

$$g(x) = \frac{1}{1+e^{-x}}. \quad \text{(Equation 8)}$$

For step 150, the search direction, $\Delta w_i$, may be found using the following equation:

$$\Delta w_i \propto \left[\frac{\partial H(y_0, y_1, \ldots y_N)}{\partial w_{i1}}, \frac{\partial H(y_0, y_1, \ldots y_N)}{\partial w_{i2}}, \ldots, \frac{\partial H(y_0, y_1, \ldots y_N)}{\partial w_{ik}}\right] \quad \text{(Equation 9)}$$

for K filter coefficients. The above equation may also be expressed in the closed-form by the following equation.

$$\frac{\partial H(y_0, \ldots, y_N)}{\partial w_{ij}} = (1-2y_0)x_i(t-j). \quad \text{(Equation 10)}$$

In place of calculating the joint entropy gradient for each time sample, the above closed-form expression may be substituted to simplify the calculations.

Removing Seismic Noise Using Independent Component Analysis

Under independent component analysis (ICA), an input seismic trace may be defined by the following equation:

$$x(t) = As(t) \quad \text{(Equation 11)}$$

where $x(t)$ is the input vector that contains the input seismic trace and noise references, A is a mixture matrix, and s is a vector containing the unknown independent components. x(t) and s(t) may be defined by the following equations.

$$x(t)=(d(t),r_1(t),\ldots,r_1(t-K),\ldots,r_L(t),\ldots,r_L(t-K))^T \quad \text{(Equation 12)}$$

$$s(t)=(s_0(t),s_1(t)\ldots,s_1(t-K),\ldots,s_N(t),\ldots,s_N(t-K))^T \quad \text{(Equation 13)}$$

where d(t) is the input seismic trace, $r_i(t)$ are the noise references, $s_i(t)$ are the unknown independent components, L is the number of filters, K is the number of filter coefficients for the L filters, and N is the number of independent components. Equations 12 and 13 provide a classic ICA model in application of blind convolution as shown in equation 1.

Figure 3:
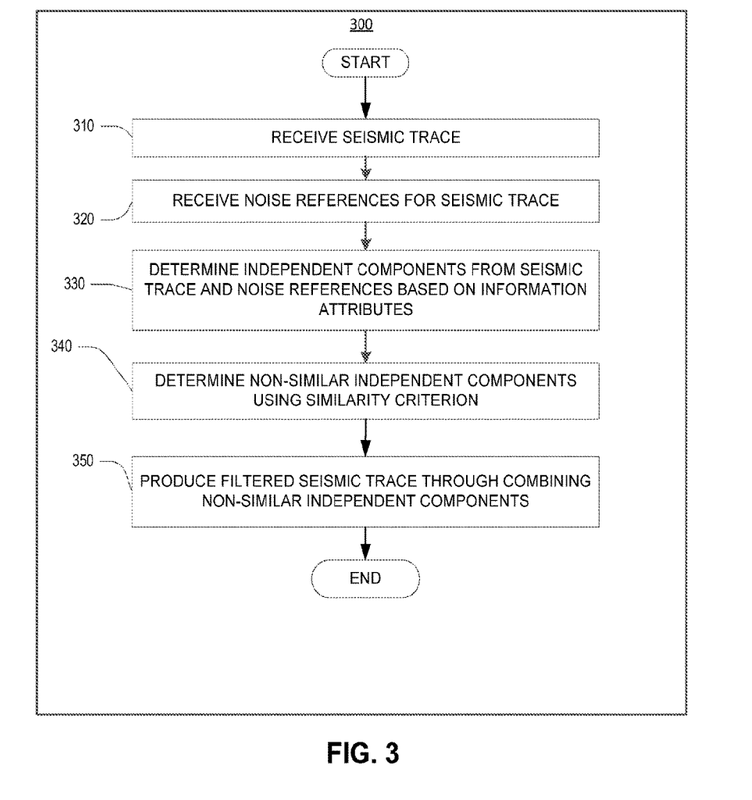
FIG. 3 illustrates a flow diagram of a method for removing noise from an input seismic trace in accordance with various implementations described herein.

FIG. 3 illustrates a flow diagram of a method for removing seismic noise from an input seismic trace in accordance with various implementations described herein. It should be understood that while the operational flow diagram indicates a particular order of execution of the operations, in other implementations, the operations might be executed in a different order. Further, in some implementations, additional operations or steps may be added to the method. Likewise, some operations or steps may be omitted. The steps in FIG. 3 may be described with respect to the stages labeled in FIG. 4.

At step 310, an input seismic trace, d(t), is received.

At step 320, noise in the input seismic trace is estimated or predicted. An estimate or noise prediction may be provided as noise reference, $r_1(t), \ldots r_L(t)$, where L is the number of noise references.

Figure 4:
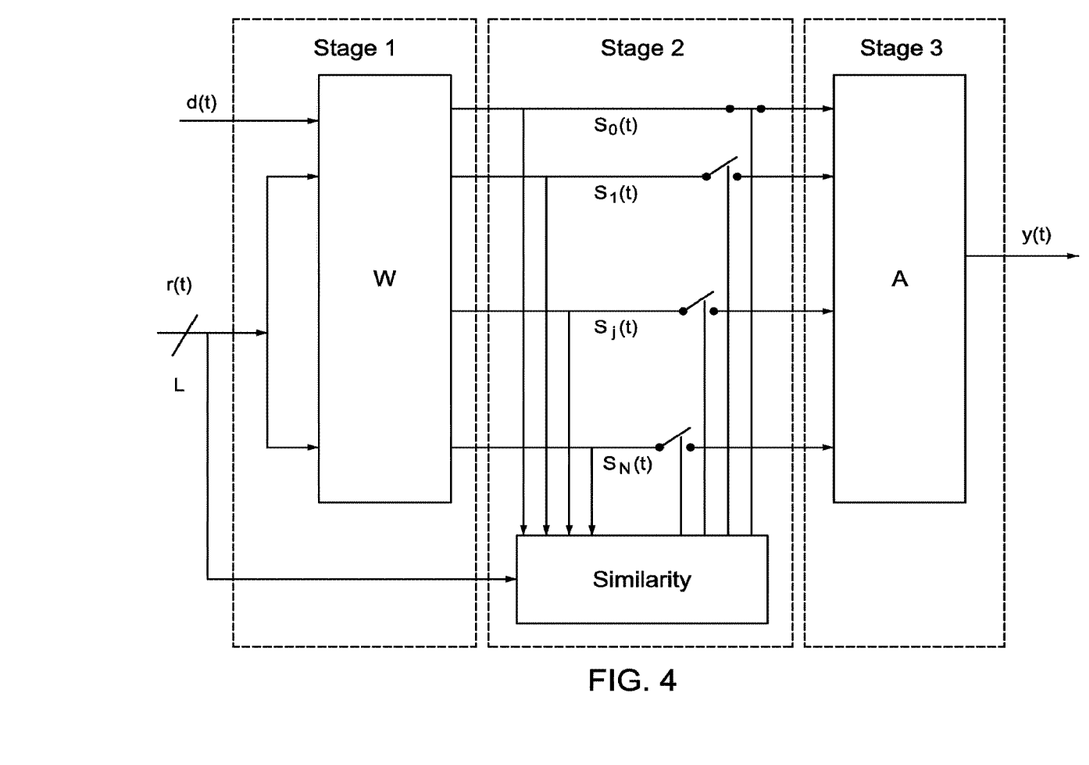
FIG. 4 illustrates a schematic diagram in accordance with various implementations described herein

At step 330, one or more independent components are determined from the input seismic trace and noise references based on one or more information attributes. Any ICA algorithm may be used to estimate a de-mixture matrix W and the independent components, s(t). For instance, the de-mixture matrix W may be a deconvolution matrix. One example of an ICA algorithm for separating the independent components is the FastICA algorithm. The ICA algorithm may also be based on an objective function similar to the increasing of information attributes performed in method 100, such as maximizing mutual information or joint entropy. This process may be formulated as the following equation:

$$s=Wx \quad \text{(Equation 14)}$$

where the de-mixture matrix W is applied to the input vector x to obtain a vector of independent components s. This step may correspond to stage 1 in FIG. 4.

At step 340, one or more non-similar independent components are determined using a similarity criterion. The similarity criterion may be used to compare the noise references from step 320 to the independent components from step 330. For instance, a similarity criterion may include using a cross-correlation operator to determine the amount of correlation between each independent component from step 320 and each of the noise references from step 330. If the amount of correlation between an independent component and a noise reference is above a predetermined threshold, then the respective independent component and the respective noise reference may be found to be similar. If an independent component is found to not be similar with any of the noise references, then the respective independent component may be determined to be a non-similar independent component. This step may correspond to stage 2 in FIG. 4.

Other similarity criteria may include using the semblance function or a similarity algorithm based on the statistical distributions between the separated independent components and the noise references.

At step 350, a filtered seismic trace, y(t) is produced through combining the non-similar independent components determined in step 340. This step may be performed using equation 11 from above. Using an estimated mixture matrix A, x(t)=As(t) may be computed, where the first element of vector x(t) may be the filtered trace, y(t). The mixture matrix A may be based on the convolution model of equations 2 or 3. This step may correspond to stage 3 in FIG. 4.

In one implementation, step 350 may proceed by determining the similar independent components using the similarity criterion. An adaptive deflation processing may then be used to subtract the similar components from the input seismic trace one by one to solve the amplitude ambiguity problem of ICA, which may be defined by the following equation:

$$y(t)=d(t)-a_i s_i(t), i=1,\ldots,N \quad \text{(Equation 15)}$$

where $a_i$ is adaptively determined by minimizing the energy of the output signal, y(t).

Computing System

Implementations of various technologies described herein may be operational with numerous general purpose or special purpose computing system environments or configurations. Examples of well known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smartphones, smartwatches, personal wearable computing systems networked with other computing systems, tablet computers, and distributed computing environments that include any of the above systems or devices, and the like.

The various technologies described herein may be implemented in the general context of computer-executable instructions, such as program modules, being executed by a computer. Generally, program modules include routines, programs, objects, components, data structures, etc. that performs particular tasks or implement particular abstract data types. While program modules may execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or both.

The various technologies described herein may also be implemented in distributed computing environments where tasks are performed by remote processing devices that are linked through a communications network, e.g., by hardwired links, wireless links, or combinations thereof. In a distributed computing environment, program modules may be located in both local and remote computer storage media including memory storage devices.

Figure 5:
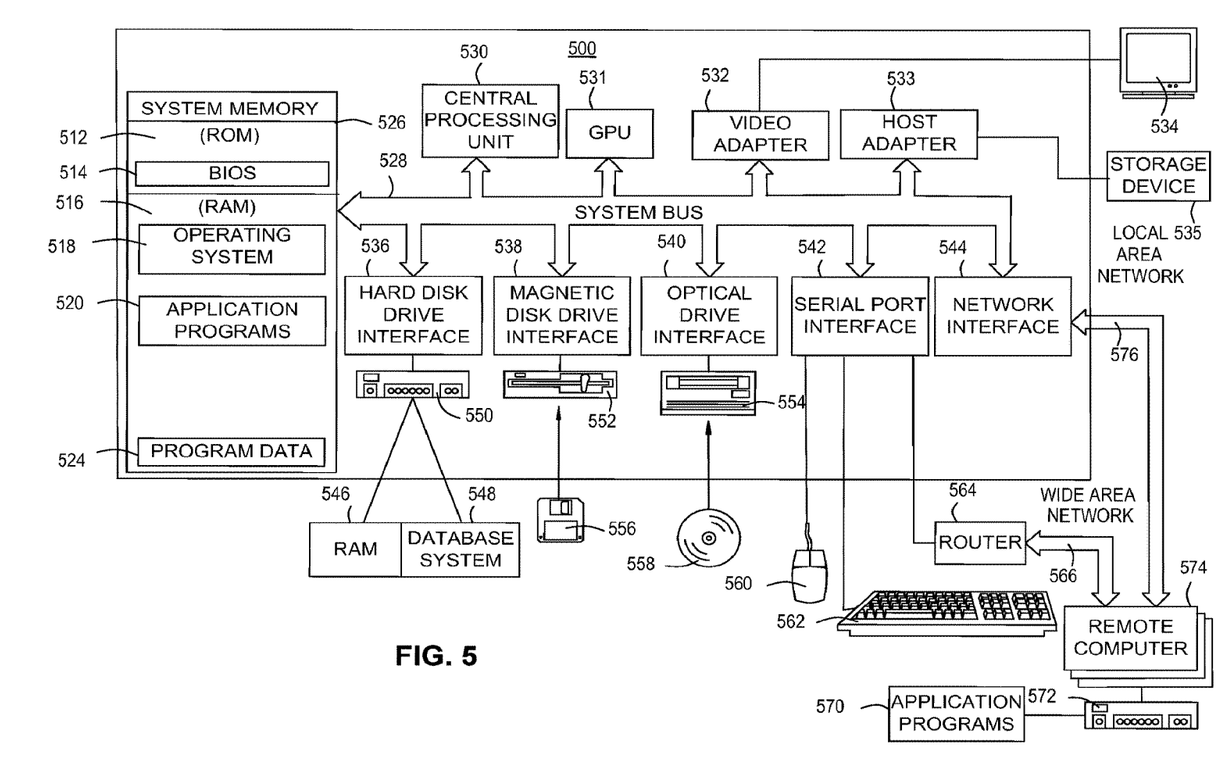
FIG. 5 illustrates a computer system in which the various technologies and techniques described herein may be incorporated and practiced.

FIG. 5 illustrates a schematic diagram of a computing system 500 in which the various technologies described herein may be incorporated and practiced. Although the computing system 500 may be a conventional desktop or a server computer, as described above, other computer system configurations may be used.

The computing system 500 may include a central processing unit (CPU) 530, a system memory 526, a graphics processing unit (GPU) 531 and a system bus 528 that couples various system components including the system memory 526 to the CPU 530. Although one CPU is illustrated in FIG. 5, it should be understood that in some implementations the computing system 500 may include more than one CPU. The GPU 531 may be a microprocessor specifically designed to manipulate and implement computer graphics. The CPU 530 may offload work to the GPU 531. The GPU 531 may have its own graphics memory, and/or may have access to a portion of the system memory 526. As with the CPU 530, the GPU 531 may include one or more processing units, and each processing unit may include one or more cores. The system bus 528 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 526 may include a read-only memory (ROM) 512 and a random access memory (RAM) 546. A basic input/output system (BIOS) 514, containing the basic routines that help transfer information between elements within the computing system 500, such as during start-up, may be stored in the ROM 512.

The computing system 500 may further include a hard disk drive 550 for reading from and writing to a hard disk, a magnetic disk drive 552 for reading from and writing to a removable magnetic disk 556, and an optical disk drive 554 for reading from and writing to a removable optical disk 558, such as a CD ROM or other optical media. The hard disk drive 550, the magnetic disk drive 552, and the optical disk drive 554 may be connected to the system bus 528 by a hard disk drive interface 556, a magnetic disk drive interface 558, and an optical drive interface 550, respectively. The drives and their associated computer-readable media may provide nonvolatile storage of computer-readable instructions, data structures, program modules and other data for the computing system 500.

Although the computing system 500 is described herein as having a hard disk, a removable magnetic disk 556 and a removable optical disk 558, it should be appreciated by those skilled in the art that the computing system 500 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 500. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The computing system 500 may also include a host adapter 533 that connects to a storage device 535 via a small computer system interface (SCSI) bus, a Fiber Channel bus, an eSATA bus, or using any other applicable computer bus interface. Combinations of any of the above may also be included within the scope of computer readable media.

A number of program modules may be stored on the hard disk 550, magnetic disk 556, optical disk 558, ROM 512 or RAM 516, including an operating system 518, one or more application programs 520, program data 524, and a database system 548. The application programs 520 may include various mobile applications ("apps") and other applications configured to perform various methods and techniques described herein. The operating system 518 may be any suitable operating system that may control the operation of a networked personal or server computer, such as Windows® XP, Mac OS® X, Unix-variants (e.g., Linux® and BSD®), and the like.

A user may enter commands and information into the computing system 500 through input devices such as a keyboard 562 and pointing device 560. Other input devices may include a microphone, joystick, game pad, satellite dish, scanner, or the like. These and other input devices may be connected to the CPU 530 through a serial port interface 542 coupled to system bus 528, but may be connected by other interfaces, such as a parallel port, game port or a universal serial bus (USB). A monitor 534 or other type of display device may also be connected to system bus 528 via an interface, such as a video adapter 532. In addition to the monitor 534, the computing system 500 may further include other peripheral output devices such as speakers and printers.

Further, the computing system 500 may operate in a networked environment using logical connections to one or more remote computers 574. The logical connections may be any connection that is commonplace in offices, enterprise-wide computer networks, intranets, and the Internet, such as local area network (LAN) 576 and a wide area network (WAN) 566. The remote computers 574 may be another a computer, a server computer, a router, a network PC, a peer device or other common network node, and may include many or all of the elements describes above relative to the computing system 500. The remote computers 574 may also each include application programs 570 similar to that of the computer action function.

When using a LAN networking environment, the computing system 500 may be connected to the local network 576 through a network interface or adapter 544. When used in a WAN networking environment, the computing system 500 may include a modem 564, wireless router or other means for establishing communication over a wide area network 566, such as the Internet. The modem 564, which may be internal or external, may be connected to the system bus 528 via the serial port interface 552. In a networked environment, program modules depicted relative to the computing system 500, or portions thereof, may be stored in a remote memory storage device 572. It will be appreciated that the network connections shown are merely examples and other means of establishing a communications link between the computers may be used.

The network interface 544 may also utilize remote access technologies (e.g., Remote Access Service (RAS), Virtual Private Networking (VPN), Secure Socket Layer (SSL), Layer 2 Tunneling (L2T), or any other suitable protocol). These remote access technologies may be implemented in connection with the remote computers 574.

It should be understood that the various technologies described herein may be implemented in connection with hardware, software or a combination of both. Thus, various technologies, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various technologies. In the case of program code execution on programmable computers, the computing device may include a processor, a storage medium readable by the processor (including volatile and non-volatile memory and/or storage elements), at least one input device, and at least one output device. One or more programs that may implement or utilize the various technologies described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations. Also, the program code may execute entirely on a user's computing device, partly on the user's computing device, as a stand-alone software package, partly on the user's computer and partly on a remote computer or entirely on the remote computer or a server computer.

Those with skill in the art will appreciate, however, that none of the listed architectures, features or standards discussed above with respect to the example computing system 500 are required for use with a computing system used in accordance with the various embodiments disclosed herein because technology and standards continue to evolve over time.

Of course, many processing techniques for collected data, including one or more of the techniques and methods disclosed herein, may also be used successfully with collected data types other than seismic data. While certain implementations have been disclosed in the context of seismic data collection and processing, those with skill in the art will recognize that one or more of the methods, techniques, and computing systems disclosed herein can be applied in many fields and contexts where data involving structures arrayed in a three-dimensional space and/or subsurface region of interest may be collected and processed, e.g., medical imaging techniques such as tomography, ultrasound, MRI and the like for human tissue; radar, sonar, and LIDAR imaging techniques; and other appropriate three-dimensional imaging problems.

Moreover, in some embodiments, a method is provided that may include receiving an input seismic trace. The method may receive multiple predictions for the input seismic trace. The method may receive filters corresponding to the multiple predictions. The method may include applying a nonlinear function to the input seismic trace and to the multiple predictions to produce respective output signals for the input seismic trace and to the multiple predictions. The nonlinear function may be capable of determining higher-order statistics. The method may update the filters based on increasing information attributes of the output signals to a predetermined threshold. The method may filter multiples corresponding to the multiple predictions from the input seismic trace using the updated filters.

In another implementation, the method may maximize the joint entropy of the output signals. The method may also include updating the filters using a search direction for each of the filters and a step method until the search direction for each of the filters reaches a predetermined value. The predetermined value may be a global optimum. The search direction may be a function of a change of joint entropy between the respective output signals. The method may also include iteratively updating the filters until the search direction for each of the filters converges to the predetermined value. The nonlinear function may approximate a cumulative density function of independent sources for a time sample.

In some embodiments, a method is provided that may include receiving an input seismic trace. The method may receive noise references for the input seismic trace. The method may receive filters corresponding to the noise references. The method may apply a nonlinear function to the input seismic trace and to the noise references to produce respective output signals for the input seismic trace and to the multiple predictions. The nonlinear function may be capable of determining higher-order statistics. The method may update the filters based on increasing one or more information attributes of the output signals to a predetermined threshold. The method may filter noise corresponding to the noise references from the input seismic trace using the updated filters.

In another implementation, the method may maximize the mutual information of the output signals. The method may also include updating the filters using a search direction for each of the filters and a step method until the search direction for each of the filters reaches a predetermined value. The predetermined value may be a global optimum. The search direction may be a function of a change of mutual information between the respective output signals. The method may also update the filters until the search direction for each of the filters converges to the predetermined value.

In some embodiments, a method is provided that may include receiving an input seismic trace. The method may receive noise references for the input seismic trace. The method may determine independent components from the input seismic trace and the noise references using an independent component analysis (ICA) algorithm based on information attributes between the input seismic trace and the noise references. The method may determine non-similar independent components using a similarity criterion by comparing the independent components to the noise references. The method may combine the non-similar independent components to produce a filtered seismic trace.

In another implementation, the information attributes may include the mutual information between the input seismic trace and each of the noise references. The information attributes may also include the joint entropy between the input seismic trace and each of the noise references. The method may compare each of the independent components individually to each of the one or more noise references. The method may also determine the independent components using a deconvolution matrix. The method may also combine the non-similar independent components using an independent component analysis mixture matrix. The method may determine an amount of correlation between each of the noise references and each of the independent components for the similarity criterion.

In some implementations, an information processing apparatus for use in a computing system is provided, and includes means for receiving an input seismic trace. The information processing apparatus may also have means for receiving one or more multiple predictions for the input seismic trace. The information processing apparatus may also have means for receiving one or more filters corresponding to the multiple predictions. The information processing apparatus may also have means for applying a nonlinear function to the input seismic trace and to the one or more multiple predictions to produce respective output signals for the input seismic trace and to the one or more multiple predictions. The nonlinear function may be capable of determining higher-order statistics. The information processing apparatus may also have means for updating the filters based on increasing one or more information attributes of the output signals to a predetermined threshold. The information processing apparatus may also have means for filtering multiples corresponding to the multiple predictions from the input seismic trace using the updated filters.

In some implementations, a computing system is provided that includes at least one processor, at least one memory, and one or more programs stored in the at least one memory, wherein the programs include instructions, which when executed by the at least one processor cause the computing system to receive an input seismic trace. The programs may further include instructions to cause the computing system to receive one or more multiple predictions for the input seismic trace. The programs may further include instructions to cause the computing system to receive one or more filters corresponding to the multiple predictions. The programs may further include instructions to cause the computing system to apply a nonlinear function to the input seismic trace and to the one or more multiple predictions to produce respective output signals for the input seismic trace and to the one or more multiple predictions. The nonlinear function may be capable of determining higher-order statistics. The programs may further include instructions to cause the computing system to update the filters based on increasing one or more information attributes of the output signals to a predetermined threshold. The programs may further include instructions to cause the computing system to filter multiples corresponding to the multiple predictions from the input seismic trace using the updated filters.

In some implementations, a computer readable storage medium is provided, which has stored therein one or more programs, the one or more programs including instructions, which when executed by a processor, cause the processor to receive an input seismic trace. The programs may further include instructions, which cause the processor to receive one or more multiple predictions for the input seismic trace. The programs may further include instructions, which cause the processor to receive one or more filters corresponding to the multiple predictions. The programs may further include instructions, which cause the processor to apply a nonlinear function to the input seismic trace and to the one or more multiple predictions to produce respective output signals for the input seismic trace and to the one or more multiple predictions. The nonlinear function may be capable of determining higher-order statistics. The programs may further include instructions, which cause the processor to update the filters based on increasing one or more information attributes of the output signals to a predetermined threshold. The programs may further include instructions, which cause the processor to filter multiples corresponding to the multiple predictions from the input seismic trace using the updated filters.

In some implementations, an information processing apparatus for use in a computing system is provided, and includes means for receiving an input seismic trace. The method may receive one or more noise references for the input seismic trace. The information processing apparatus may also have means for receiving one or more filters corresponding to the noise references. The information processing apparatus may also have means for applying a nonlinear function to the input seismic trace and to the one or more noise references to produce respective output signals for the input seismic trace and to the one or more multiple predictions. The nonlinear function may be capable of determining higher-order statistics. The information processing apparatus may also have means for updating the filters based on increasing one or more information attributes of the output signals to a predetermined threshold. The information processing apparatus may also have means for filtering noise corresponding to the noise references from the input seismic trace using the updated filters.

In some implementations, a computing system is provided that includes at least one processor, at least one memory, and one or more programs stored in the at least one memory, wherein the programs include instructions, which when executed by the at least one processor cause the computing system to receive an input seismic trace. The programs may further include instructions to cause the computing system to receive one or more noise references for the input seismic trace. The programs may further include instructions to cause the computing system to receive one or more filters corresponding to the noise references. The programs may further include instructions to cause the computing system to apply a nonlinear function to the input seismic trace and to the one or more noise references to produce respective output signals for the input seismic trace and to the one or more multiple predictions. The nonlinear function may be capable of determining higher-order statistics. The programs may further include instructions to cause the computing system to update the filters based on increasing one or more information attributes of the output signals to a predetermined threshold. The programs may further include instructions to cause the computing system to filter noise corresponding to the noise references from the input seismic trace using the updated filters.

In some implementations, a computer readable storage medium is provided, which has stored therein one or more programs, the one or more programs including instructions, which when executed by a processor, cause the processor to receive an input seismic trace. The programs may further include instructions, which cause the processor to receive one or more noise references for the input seismic trace. The programs may further include instructions, which cause the processor to receive one or more filters corresponding to the noise references. The programs may further include instructions, which cause the processor to apply a nonlinear function to the input seismic trace and to the one or more noise references to produce respective output signals for the input seismic trace and to the one or more multiple predictions. The nonlinear function may be capable of determining higher-order statistics. The programs may further include instructions, which cause the processor to update the filters based on increasing one or more information attributes of the output signals to a predetermined threshold. The programs may further include instructions, which cause the processor to filter noise corresponding to the noise references from the input seismic trace using the updated filters.

In some implementations, an information processing apparatus for use in a computing system is provided, and includes means for receiving an input seismic trace. The information processing apparatus may also have means for receiving one or more noise references for the input seismic trace. The information processing apparatus may also have means for determining one or more independent components from the input seismic trace and the one or more noise references using an independent component analysis algorithm based on one or more information attributes between the input seismic trace and the one or more noise references. The information processing apparatus may also have means for determining one or more non-similar independent components using a similarity criterion by comparing the independent components to the one or more noise references. The information processing apparatus may also have means for combining the non-similar independent components to produce a filtered seismic trace.

In some implementations, a computing system is provided that includes at least one processor, at least one memory, and one or more programs stored in the at least one memory, wherein the programs include instructions, which when executed by the at least one processor cause the computing system to receive an input seismic trace. The programs may further include instructions to cause the computing system to receive one or more noise references for the input seismic trace. The programs may further include instructions to cause the computing system to determine one or more independent components from the input seismic trace and the one or more noise references using an independent component analysis algorithm based on one or more information attributes between the input seismic trace and the one or more noise references. The programs may further include instructions to cause the computing system to determine one or more non-similar independent components using a similarity criterion by comparing the independent components to the one or more noise references. The programs may further include instructions to cause the computing system to combine the non-similar independent components to produce a filtered seismic trace.

In some implementations, a computer readable storage medium is provided, which has stored therein one or more programs, the one or more programs including instructions, which when executed by a processor, cause the processor to receive an input seismic trace. The programs may further include instructions, which cause the processor to receive one or more noise references for the input seismic trace. The programs may further include instructions, which cause the processor to determine one or more independent components from the input seismic trace and the one or more noise references using an independent component analysis algorithm based on one or more information attributes between the input seismic trace and the one or more noise references. The programs may further include instructions, which cause the processor to determine one or more non-similar independent components using a similarity criterion by comparing the independent components to the one or more noise references. The programs may further include instructions, which cause the processor to combine the non-similar independent components to produce a filtered seismic trace.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for removing seismic noise from an input seismic trace, comprising:
    receiving the input seismic trace, wherein the input seismic trace depicts a structure of a subsurface volume;
    receiving one or more noise references for the input seismic trace;
    determining independent components from the input seismic trace, wherein determining the independent components comprises:
        estimating a de-mixing matrix for the input seismic trace using an independent component analysis (ICA) algorithm; and
        applying the de-mixing matrix to the input seismic trace to obtain the independent components;
    determining one or more non-similar independent components using a similarity criterion by comparing the independent components to the one or more noise references, wherein determining the one or more non-similar independent components comprises:
        determining an amount of correlation between a first independent component of the independent components from the input seismic trace and at least one of the one or more noise references is above a predetermined threshold;
        in response, identifying the first independent component as similar component;
        determining an amount of correlation between a second independent component of the independent components from the input seismic trace and each of the one or more noise references is below the predetermined threshold; and
        in response, identifying the second independent component as a non-similar component; and
    combining the non-similar independent components to produce a filtered seismic trace, wherein the filtered seismic trace depicts the subsurface volume, and the filtered seismic trace contains less noise than the input seismic trace.

2. The method of claim 1, wherein the ICA algorithm is based in part on information attributes comprising mutual information between the input seismic trace and each of the noise references.

3. The method of claim 1, wherein the ICA algorithm is based in part on information attributes comprising joint entropy between the input seismic trace and each of the noise references.

4. The method of claim 1, wherein comparing the independent components to the one or more noise references comprises comparing each of the independent components individually to each of the one or more noise references.

5. The method of claim 1, wherein the de-mixing matrix comprises a deconvolution matrix.

6. The method of claim 1, wherein combining the non-similar independent components is performed using an independent component analysis mixture matrix.

7. The method of claim 1, wherein the ICA algorithm comprises a FastICA algorithm.

8. The method of claim 1, wherein estimating the de-mixing matrix comprises maximizing a mutual information or joint entropy value of an objective function to determine the de-mixing matrix.

9. The method of claim 1, further comprising subtracting the similar components from the input seismic trace one-by-one using an adaptive deflation process, wherein the adaptive deflation process includes applying a term to the independent components that is determined by minimizing an energy of the filtered seismic trace.

* * * * *